United States Patent [19]

Coleman, III

[11] Patent Number: 4,612,300

[45] Date of Patent: * Sep. 16, 1986

[54] NOVEL CATALYST FOR PRODUCING RELATIVELY NARROW MOLECULAR WEIGHT DISTRIBUTION OLEFIN POLYMERS

[75] Inventor: William M. Coleman, III, Lake Jackson, Tex.

[73] Assignee: The Dow Chemical Company, Midland, Mich.

[*] Notice: The portion of the term of this patent subsequent to Feb. 9, 1999 has been disclaimed.

[21] Appl. No.: 741,991

[22] Filed: Jun. 6, 1985

[51] Int. Cl.$^4$ ................................................ C08F 4/64
[52] U.S. Cl. ..................................... 502/113; 526/116
[58] Field of Search ........................................ 502/113

[56] References Cited

U.S. PATENT DOCUMENTS

| | | | |
|---|---|---|---|
| 3,135,809 | 6/1964 | Bosmasian | 502/103 X |
| 4,314,912 | 2/1982 | Lowery et al. | 502/115 |
| 4,330,646 | 5/1982 | Sakurai et al. | 502/113 X |
| 4,333,851 | 6/1982 | Speakman et al. | 502/113 |
| 4,452,914 | 6/1984 | Coleman et al. | 502/122 |
| 4,506,027 | 3/1985 | Invernizzi et al. | 502/113 X |

OTHER PUBLICATIONS

"Chelate Compounds of Titanium With Salicylaldehyde and Methyl Salicylate", by A. Yamamoto and S. K. Kambara, *J. Inorg. Nucl. Chem.*, 1961, vol. 21, pp. 58–63.

"Die Einwirkung von Titantetrachlorid auf Sauerstoffhaltige Organische Verbindungen", by A. Rosenhein in *Berichte der Deutschen Chemischen Gesellschaft*, 1915, pp. 447–452.

"Transition Metal Complexes of o-Benzoquinone, o-Semiquinone and Catecholate Ligands", by C. G. Pierpont and R. M. Buchanan, *Coordination Chemistry Review*, vol. 38, pp. 45–87, 1981.

Article by H. Funk in *J. Prakt. Chem.*, 1956, pp. 320–332.

*Primary Examiner*—Patrick P. Garvin
*Attorney, Agent, or Firm*—James G. Carter

[57] ABSTRACT

Polymers of α-olefins having a relatively narrow molecular weight distribution are prepared by employing a Ziegler-Natta magnesium halide supported catalyst containing both titanium and vanadium.

5 Claims, No Drawings

NOVEL CATALYST FOR PRODUCING RELATIVELY NARROW MOLECULAR WEIGHT DISTRIBUTION OLEFIN POLYMERS

BACKGROUND OF THE INVENTION

The present invention concerns a catalyst for polymerizing α-olefins and to a process for polymerizing α-olefins. The resultant polymers have relatively narrow molecular weight distributions.

Lowery, Jr. et al in U.S. Pat. No. 4,250,288, U.S. Pat. No. 4,319,011, and Coleman III, et al in U.S. Pat. No. 4,452,914 disclose high efficiency magnesium halide supported Ziegler Natta catalysts for polymerizing α-olefins. While the resultant polymers are highly useful, it would be desirable if the molecular weight distribution of such polymers were narrowed somewhat so as to result in polymers for film applications with improved clarity and toughness. The present invention provides a method for narrowing the molecular weight distribution of polymers prepared with the Lowery et al and similar catalysts.

SUMMARY OF THE INVENTION

The present invention pertains to an improvement in a catalyst which is the catalytic product resulting from reacting in an inert hydrocarbon medium (A) at least one hydrocarbon soluble organomagnesium component represented by the formula $MgR''_2 \cdot xMR''_y$ wherein each $R''$ is independently a hydrocarbyl group having from 1 to 20 carbon atoms; M is a metal selected from Al, Zn, Si, Sn, B and P; y has a number corresponding to the valence of M and x has a value from zero to about 10;

(B) a sufficient quantity of at least one halide source so as to convert all of the organic groups attached to a magnesium atom in component (A) to a halide group; said halide source being selected from (1) an active non-metallic halide, said non-metallic halide corresponding to the formula $R'X$ wherein $R'$ is hydrogen or a hydrocarbyl group having from 1 to about 20 carbon atoms and such that the hydrocarbyl halide is at least as active as sec-butyl chloride and does not poison the catalyst and X is halogen; or (2) a metallic halide corresponding to the formula $MR_{y-a}X_a$ wherein M is a metal of Group IIIA or IVA of Mendeleev's Periodic Table of Elements, R is a monovalent hydrocarbyl group having from 1 to about 20 carbon atoms, X is halogen, y is a number corresponding to the valence of M and a is a number from 1 to y;

(C) at least one titanium compound represented by the formula $Ti(OR)_xX_{4-x}$ wherein each R is independently a hydrocarbyl group having from 1 to about 20 carbon atoms; X is a halogen and x has a value from zero to 4; and (D) optionally, at least one compound containing at least one aromatic hydroxyl group or at least one aliphatic hydroxyl group or a mixture of such compounds; and when components (A) and/or (B) do not contain or contain an insufficient quantity of aluminum, then (E) an aluminum compound represented by the formula $AlR_{y'}X_{y''}$ wherein R is a hydrocarbyl group having from 1 to about 10 carbon atoms; X is halogen and $y'$ and $y''$ each have a value of from zero to three with the sum of $y'$ and $y''$ being three is employed;

and wherein the components are employed in quantities so as to provide the following ratios:

(1) a Mg:Ti atomic ratio of from about 1:1 to about 200:1, preferably from about 2:1 to about 100:1, most preferably from about 5:1 to about 50:1;

(2) components (C) and (D) are employed in quantities which provide a molar ratio of (D):(C) of from about 0:1 to about 10:1, preferably from about 1:1 to about 4:1, most preferably from about 1:1 to about 2:1;

(3) an excess X to Al ratio of from about 0.0005:1 to about 10:1, preferably from about 0.002:1 to about 2:1, most preferably from about 0.01:1 to about 1.4:1;

(4) an Al:Ti atomic ratio of from about 0.1:1 to about 2000:1, preferably from about 0.5:1 to about 200:1, most preferably from about 1:1 to about 75:1;

wherein the improvement resides in employing in the reaction, (F) a vanadium compound represented by the formulas $VO(X)_3$, $V(X)_4$ or $VO(OR)_3$ wherein X is halogen and R is a hydrocarbyl group having from 1 to 10 carbon atoms;

the Mg:Ti ratio expressed above is expressed as a Mg:Ti+V ratio with the same values as the Mg:Ti ratio and wherein component (F) is employed in quantities which provides a V:Ti ratio of from about 0.1:1 to about 50:1, preferably from about 0.5:1 to about 10:1, most preferably from about 1:1 to about 5:1.

The excess X is the quantity of halide above that which would be theoretically required to convert the magnesium compound to the dihalide.

The present invention also pertains to novel bidentate ligand-containing vanadium complexes represented by formula XV as hereinafter described.

The present invention also pertains to a process for polymerizing α-olefins employing the aforedescribed catalyst.

DETAILED DESCRIPTION OF THE INVENTION

The present invention is most advantageously practiced in a polymerization process wherein an α-olefin is polymerized, generally in the presence of hydrogen as a molecular weight control agent, in a polymerization zone containing an inert diluent and the catalytic reaction product as hereinbefore described. Especially advantageous is the copolymerization of ethylene and higher α-olefins using the catalytic reaction product of this invention. The foregoing polymerization process is most beneficially carried out under relatively low temperature and pressure (as compared to classical high pressure free radical techniques), although very high pressures are optionally employed.

Olefins which are suitably homopolymerized or copolymerized in the practice of this invention are generally the aliphatic α-monoolefins or α-diolefins having from 2 to 18 carbon atoms. Illustratively, such α-olefins can include ethylene, propylene, butene-1, pentene-1, 3-methylbutene-1, 4-methylpentene-1, hexene-1, octene-1, dodecene-1, octadecene-1, 1,7-octadiene, 1,4-hexadiene, mixtures thereof and the like. It is understood that α-olefins may be copolymerized with other α-olefins and/or with small amounts, i.e., up to about 25 weight percent based on the polymer, of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene with up to 50, especially from about 0.1 to about 40, weight percent of propylene, butene-1, hexene-1, octene-1, 4-methylpentene-1, 1,7-octadiene, 1,4-hexadiene or similar α-olefine or diolefin, based on total monomer.

Particularly suitable titanium compounds which can be employed herein include for example, tetraethoxy titanium, tetraisopropoxy titanium, tetra-n-butoxy titanium, tetraphenoxy titanium, tetra-n-propoxy titanium, tetra-(2-ethylhexoxy)titanium, di-n-butoxy titanium dichloride, titanium tetrachloride, mixtures thereof and the like.

Particularly suitable vanadium compounds which can be employed herein include, for example, vanadium oxytrichloride, vanadium oxytriisopropoxide, vanadium tetrachloride, mixtures thereof and the like.

Particularly suitable organomagnesium compounds include, for example, hydrocarbon soluble dihydrocarbylmagnesium such as the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein the alkyl has from 1 to 20 carbon atoms. Exemplary suitable magnesium diaryls include diphenylmagnesium, dibenzylmagnesium, and ditolylmagnesium. Suitable organomagnesium compounds include alkyl and aryl magnesium alkoxides and aryloxides and aryl and alkyl magnesium halides with the halogen-free organomagnesium compounds being more desirable.

Among the halide sources which can be employed herein are the active non-metallic halides and metallic halides.

Suitable non-metallic halides are represented by the formula R'X wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides which can be employed herein include those represented by the formula $MR_{y-a}X_a$ wherein M is a metal of Groups IIB, IIIA or IVA of Mendeleev's Periodic Table of Elements, R is a monovalent organic radical, X is a halogen, Y has a value corresponding to the valence of M and a has a value from 1 to y. Preferred metallic halides are aluminum halides of the formula $AlR_{3-a}X_a$ wherein each R is independently hydrocarbyl as hereinbefore defined such as alkyl, X is a halogen and a is a number from 1 to 3. Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g., R", and the organic moieties of the halide source, e.g., R and R', are suitably any other organic radical provided that they do not contain functional groups that poison conventional Ziegler catalysts.

The magnesium halide can be preformed from the organomagnesium compound and the halide source or it can be formed insitu in which instance the catalyst is preferably prepared by mixing in a suitable solvent or reaction medium (1) the organomagnesium component and (2) the halide source, followed by the other catalyst components.

Suitable aliphatic and aromatic hydroxyl-containing compounds which can be employed herein include, for example, those represented by the following formulas

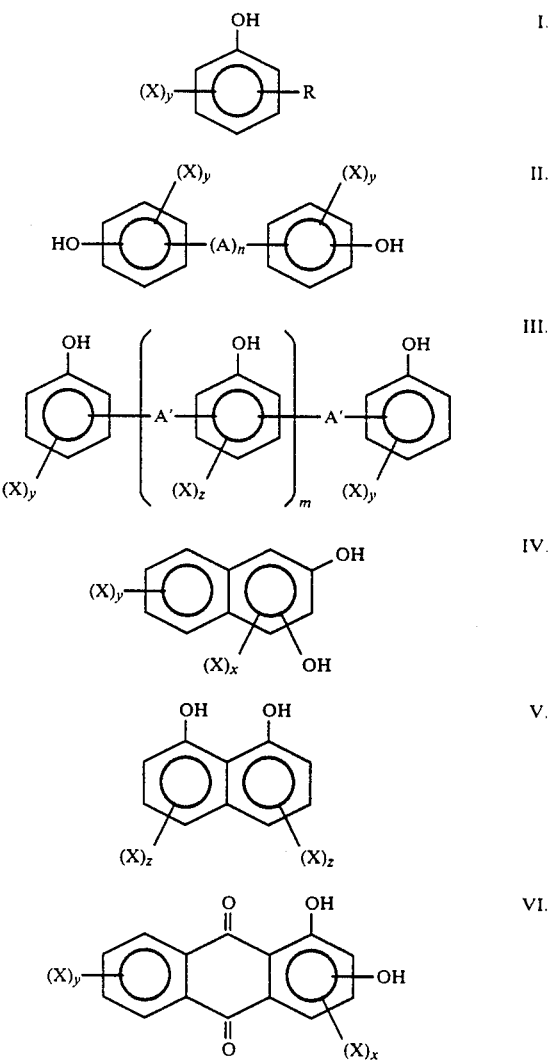

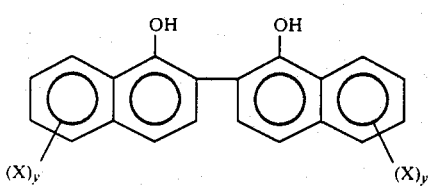

VII.

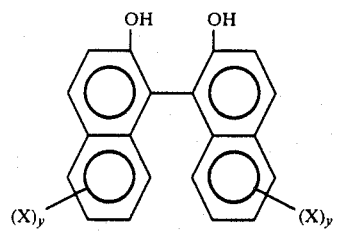

VIII.

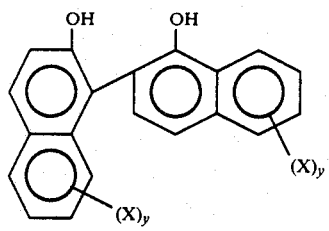

IX.

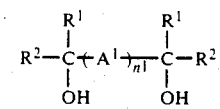

X.

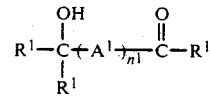

XI.

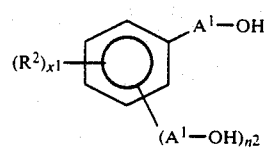

XII.

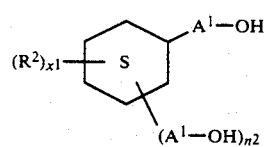

XIII.

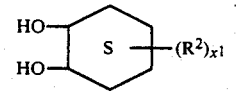

XIV.

wherein each A is independently a divalent hydrocarbyl group having from 1 to about 10, preferably from 1 to about 4, carbon atoms, —O—, —S—, —S—S—,

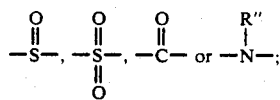

each A' is independently a divalent hydrocarbyl group having from 1 to about 10, preferably from about 1 to about 4, carbon atoms; each R is independently —OH,

or a hydroxyl substituted hydrocarbyl or a hydroxyl substituted hydrocarbyloxy group having from 1 to about 20, preferably from 1 to about 10 carbon atoms; each R' is independently hydrogen, hydroxyl or a hydrocarbyl or hydrocarbyloxy group having from 1 to about 10, preferably from 1 to about 6, carbon atoms; each R" is independently hydrogen or a hydrocarbyl group having from 1 to about 10, preferably from 1 to about 6, carbon atoms; each X is independently a hydroxyl group, a nitro group, a nitrile group, a hydrocarbyl group, a hydrocarbyloxy group, a hydroxyl substituted hydrocarbyl or a hydroxyl substituted hydrocarbyloxy group each such groups having from 1 to about 20, preferably from 1 to about 12, carbon atoms or a halogen; m has an average value of from about 0.01 to about 6, preferably from about 1 to about 3; each n independently has a value of zero or 1; each x independently has a value of from zero to 2; each y independently has a value of from zero to 4; preferably from 1 to 2 and z has a value of from zero to 3, preferably from 1 to 2.

wherein each $A^1$ is independently a divalent hydrocarbyl group having from 1 to about 10, preferably from 1 to about 4, carbon atoms; each $R^1$ is independently hydrogen, a hydrocarbyl group or a halogen, nitro or hydrocarbyloxy substituted hydrocarbyl group, each such hydrocarbyl or hydrocarbyloxy groups having from 1 to about 20, preferably from 1 to about 10 carbon atoms; each $R^2$ is independently hydrogen, a halogen atom, a hydrocarbyl group, a hydrocarbyloxy group or a halogen, nitro or hydrocarbyloxy substituted hydrocarbyl group or a halogen, nitro or hydrocarbyloxy substituted hydrocarbyloxy group, each such hydrocarbyl or hydrocarbyloxy group having from 1 to about 20, preferably from 1 to about 10 carbon atoms; each $n^1$ is independently zero or 1; each $n^2$ has a value of from 1 to 5, preferably from 1 to 2, and each $x^1$ independently has a value of from zero to 4.

Particularly suitable compounds containing at least one phenolic hydroxyl group which can be employed herein includes, for example, catechol, resorcinol, bisphenol A, 4-t-butylcatechol, bis(hydroxyphenyl)methane, 4-t-octylcatechol, 3-isopropylcatechol, 3-isopropyl-6-methylcatechol, 3,5-di-t-butylcatechol, 3-methoxycatechol, o,o'-bisphenol, alizarin, 2,3-dihydroxy naphthalene, salicylaldehyde, o-hydroxy acetophenone, o-hydroxy benzophenone, 3,4-dihydroxy benzaldehyde, 1,1'-bi-2-naphthol, 3-methoxy salicylaldehyde, mixtures thereof and the like.

Particularly suitable compounds containing at least one aliphatic hydroxyl group which can be employed herein includes, for example, 1,2-dihydroxyoctane, d,l-benzoin, 1,2-benzenedimethanol, cis-1,2-cyclohexanedimethanol, 1,2-butanediol, 1,3-dihydroxypropane, mixtures thereof and the like.

Mixtures of the aforementioned aromatic hydroxyl-containing and aliphatic hydroxyl-containing compounds can also be employed.

The compound or complex formed from reacting said titanium and/or vanadium component and said component having at least one hydroxyl group per molecule can be utilized as formed or the product can be isolated and then utilized at the appropriate place in the catalyst preparation.

When it is desired to prepare complexes employing molar ratios of titanium and/or vanadium compound to hydroxyl-containing compound of about 1 to 1, it is preferred to add the hydroxyl-containing compound to the titanium and/or vanadium compound.

When it is desired to prepare complexes employing molar ratios of titanium and/or vanadium compound to hydroxyl-containing compound of about 1 to 2, it is preferred to add the titanium and/or vanadium compound to the hydroxyl-containing compound.

Regardless of the molar ratios employed, when it is desired to prepare a complex containing mixed ligands by employing different hydroxyl-containing compounds, it is preferred to add the hydroxyl-containing compounds to the titanium and/or vanadium compound wherein the most acidic hydroxyl-containing compound is added first.

When the titanium compound and/or vanadium compound and hydroxyl-containing compounds are prereacted, temperatures from about 0° C. to about 200° C., preferably from about 20° C. to about 100° C., can be employed.

The aforementioned compounds or complexes formed by reacting the titanium component with the aromatic hydroxyl-containing or aliphatic hydroxyl-containing component are more fully described by Coleman, III and Edmondson in U.S. Pat. No. 4,452,914 issued June 5, 1984; by Coleman, III and Edmondson in copending application Ser. No. 565,436 filed Dec. 27, 1983 entitled "Novel Titanium Complexes and Catalysts Prepared Therefrom" and by Coleman, III and Edmondson in copending application Ser. No. 665,336 filed Oct. 26, 1984 entitled "Novel Titanium Complexes and Catalysts Prepared Therefrom", all of which are incorporated herein by reference.

The aforementioned vanadium complexes are represented by formula XV as follows:

$$QQ'VO \qquad XV.$$

wherein Q is a ligand represented by formulas XVI–XX and Q' is a halide or a hydrocarbyloxy group having from 1 to about 20 carbon atoms.

Formulas XVI–XX are as follows:

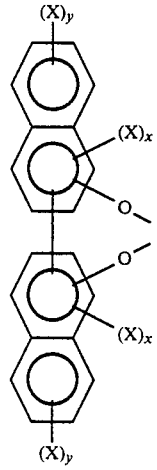

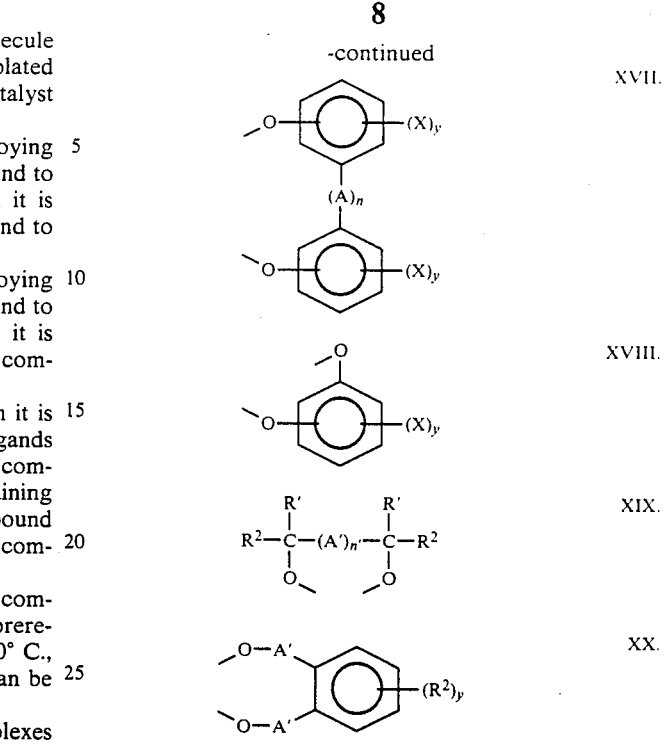

wherein A, A', R', $R^2$, X, n, x and y are as defined above.

The foregoing catalyst components are combined in proportions sufficient to provide atomic ratios as previously mentioned.

In cases wherein neither the organomagnesium component nor the halide source contains aluminum or contains an insufficient quantity of aluminum, it is necessary to include in the total catalyst an aluminum compound such as an alkyl aluminum compound, e.g., a trialkyl aluminum, an alkyl aluminum halide or an aluminum halide. If polymerization temperatures below 180° C. are employed, the atomic ratios of Al:Ti may be from about 0.1:1 to about 2000:1, preferably from 1:1 to about 200:1. However, when polymerization temperatures above 180° C. are employed, the aluminum compound is used in proportions such that the Al:Ti ratio is less than 120:1, preferably less than 50:1. It is understood, however, that the use of very low amounts of aluminum necessitates the use of high purity solvents or diluents in the polymerization zone. Further, other components present in the zone should be essentially free of impurities which react with aluminum alkyls. Otherwise, additional quantities of an organometallic compound as previously described, preferably an organo-aluminum compound, must be used to react with such impurities. Moreover, it is understood that in the catalyst the aluminum compound should be in the form of trialkyl aluminum or alkyl aluminum halide provided that the alkyl aluminum halide be substantially free of alkyl aluminum dihalide. In the above mentioned aluminum compounds, the alkyl groups independently have from 1 to about 20, preferably from 1 to about 10 carbon atoms.

When additional quantities of aluminum compound are employed, it can be added to the aforementioned catalyst during the preparation thereof or the aluminum deficient catalyst can be mixed with the appropriate aluminum compound prior to entry into the polymerization reactor or, alternatively, the aluminum deficient catalyst and the aluminum compound can be added to the polymerization reactor as separate streams or additions.

The foregoing catalytic reaction is preferably carried out in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquified ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when free of any olefin compounds and other impurities, and especially those having boiling points in the range from about $-50°$ to about $200°$ C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about $-100°$ to about $200°$ C., preferably from about $0°$ to about $100°$ C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

While the catalysts can be prepared by adding the components in essentially any order, it is preferred to add the components in one of the following orders:

1. (A, B, C and D prereacted), F, E.
2. A, B, C, D, F, E.
3. A, B, C, F, D, E.
4. A, B, F, C, D, E.
5. (A and B prereacted), C, D, F, E.
6. (A, B and C prereacted), D, F, E.
7. A, B (C and D prereacted), F, E.
8. (A, B and F prereacted), C, D, E.

In the polymerization process employing the aforementioned catalytic reaction product, polymerization is effected by adding a catalytic amount of the above catalyst composition to a polymerization zone containing α-olefin monomer, or vice versa. Any polymerization method can be employed including slurry, solution, gas phase, high pressure process, and the like. The polymerization zone is usually maintained at temperatures in the range from about $0°$ to about $300°$ C., preferably at solution polymerization temperatures, e.g., from about $130°$ to about $250°$ C., for a residence time of about a few seconds to several days, preferably 15 seconds to 2 hours (7200 s). It is generally desirable to carry out the polymerization in the absence of moisture and oxygen and a catalytic amount of the catalytic reaction product is generally within the range from about 0.0001 to about 0.1 millimole titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally, in the polymerization process, a carrier which may be an inert organic diluent or solvent or excess monomer is employed. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined hereinbefore.

The polymerization pressures preferably employed are relatively low, e.g., from about 5 to about 10,000 psig (0.034-68.9 MPa), preferably from about 50 to about 1000 psig, (0.345-6.89 MPa), most preferably from about 100 to about 700 psig (0.689-4.8 MPa). However, polymerization within the scope of the present invention can occur at pressures from atmospheric up to pressures determined by the capabilities of the polymerization equipment, which can include pressures up to about 50,000 psig (344.5 MPa). During polymerization it is desirable to stir the polymerization recipe to obtain better temperature control and to maintain uniform polymerization mixtures throughout the polymerization zone.

In order to optimize catalyst yields in the polymerization of ethylene under solution conditions, it is preferable to maintain an ethylene concentration in the solvent in the range of from about 1 to about 10 weight percent, most advantageously from about 1.2 to about 2 weight percent. To achieve this, when an excess of ethylene is fed into the system, a portion of the ethylene can be vented. In other processes, it is preferred to conduct the polymerization in an excess of the α-olefin being polymerized in order to optimize catalyst yields.

Hydrogen can be employed in the practice of this invention to control the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present, in order to remove the heat of reaction. In any event, adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling media to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue and to possess a relatively narrow molecular weight distribution.

The following examples are given to illustrate the invention, and should not be construed as limiting its scope. All percentages are by weight and all parts are by molar or atomic ratio unless otherwise indicated.

In the following examples, the melt index values $I_2$ and $I_{10}$ were determined by ASTM D 1238-70 and the density values were determined by ASTM D 1248.

EXAMPLES

The position of ring substituents employed herein are in accordance with the Definitive Rules For Nomenclature of Organic Chemistry as provided in the *Handbook of Chemistry and Physics*, 50th Ed., Chemical Rubber Co., page C-1 et seq.

PREPARATION OF COMPLEXES

The new vanadium complexes were prepared by mixing stock solutions (0.015 molar) of the vanadium source, vanadium oxytrichloride ($VOCl_3$) or vanadium oxytriisopropoxide ($VO)(Oipr)_3$, and the aromatic hydroxyl and aliphatic hydroxyl ligands in the desired ratio. The ratio (L/M) of moles ligand (L) to moles of vanadium in the vanadium source (M) utilized to prepare the desired complexes employed in the following examples is shown under the column heading L/M. The various solutions were prepared at ambient temperatures by diluting the vanadium source and/or ligand with Isopar ® E (an isoparaffinic hydrocarbon fraction having a boiling range of 116°–134° C.) to the desired volume to produce 0.015 molar solutions. These solutions were stored under a nitrogen atmosphere to prevent decomposition.

PREPARATION OF CATALYST COMPOSITIONS

1. Preparation of Anhydrous $MgCl_2$

To 18.52 ml of 1.06 molar dibutyl magnesium was added 71.48 ml of Isopar ® E. Anhydrous electronic grade HCl was passed through the solution until all of the magnesium alkyl had been converted to magnesium chloride. Excess HCl was stripped from the slurry by purging with dry $N_2$. The resulting slurry (0.2 molar) of $MgCl_2$ in Isopar ® E (IPE) was stored under a nitrogen atmosphere and utilized as a stock solution in the preparation of catalyst compositions.

2. Catalyst Composition

The catalyst compositions were prepared by adding with stirring under a nitrogen atmosphere to a 4-ounce (118.3 cc) serum bottle the following components in the indicated order. Components were stirred for a minimum of 8 hours (28,800 s) prior to the addition of the next component.

CATALYST PREPARATION TYPE A 100 ml 0.2M $MgCl_2$ in IPE
A ml of 1.5M EADC if required
B ml of neat Ti complex (Tipt or $TiCl_4$)
C ml of neat V complex if required ($VOCL_3$; VO-($Oipr)_3$; or $VCl_4$)
D moles of neat ligand if required
18.32−(A+B+C) ml IPE

CATALYST PREPARATION TYPE B 100 ml 0.2M $MgCl_2$ in IPE
A ml of 1.5M EADC if required
C ml of neat V complex if required ($VOCl_3$; $VO(Oipr)_3$; or $VCl_4$)
B ml of neat Ti complex (Tipt or $TiCl_4$)
D moles of neat ligand if required
18.32−(A+B+C) ml IPE

CATALYST PREPARATION TYPE C 100 ml 0.2M $MgCl_2$ in IPE
A ml of 1.5M EADC if required
C ml of neat V complex if required ($VOCl_3$; $VO(Oipr)_3$; or $VCl_4$)
D moles of neat ligand if required
B ml of neat Ti complex (Tipt or $TiCl_4$)
18.32−(A+B+C) ml IPE

CATALYST PREPARATION TYPE D 100 ml 0.2M $MgCl_2$ in IPE
C ml of neat V complex if required ($VOCl_3$; $VO(Oipr)_3$; or $VCl_4$)
A ml of 1.5M EADC if required
B ml of neat Ti complex (Tipt or $TiCl_4$)
D moles of neat ligand if required
18.32−(A+B+C) ml IPE

CATALYST PREPARATION TYPE E 100 ml 0.2M $MgCl_2$ in IPE
A ml of 1.5M EADC is required
B ml of neat Ti complex (Tipt or $TiCl_4$)
D moles of neat ligand if required
C ml of neat V complex if required ($VOCl_3$; $VO(Oipr)_3$; or $VCl_4$)
18.32−(A+B+C) ml IPE

CATALYST PREPARATION TYPE F

50−(B+C) ml IPE
3.67 ml of Catalyst Type A, B, C, D or E as indicated in the Table
B ml of 0.015M V compound in IPE
C ml of 0.15M triethylaluminum

POLYMERIZATION CONDITION

General Procedure

A stirred, 1 gallon (3.79 l) batch reactor containing 2 liters of Isopar ® E and 300 ml of octene-1 was heated to the desired temperature of 195° C. and the solvent/monomer vapor pressure recorded. To this was added 0–10 psig of hydrogen and the ethylene was added to give the desired final reactor pressure of 450 psi. An amount of the above catalyst as described under catalyst preparation was injected into the reactor and the reactor pressure and temperature were maintained constant at the desired final pressure temperature by continually feeding ethylene during the polymerization run and controlling the temperature with cooling. The total reaction time was 15 minutes (900 s). The resulting copolymer properties are given in the following Table I and Table II.

TABLE I

| COMPARATIVE EXPERIMENT LETTER OR EXAMPLE # | CATALYST TYPE AND VOLUMES | VOLUMES OF CATALYST F | $I_2$ | $I_{10}$ | RATIO OF Mg/Al/Cl/V/Ti | LIGAND | $H_2$ psi |
|---|---|---|---|---|---|---|---|
| 1 | A wherein A = 0; B = 0.055 TiCl$_4$; C = 0.053 VCl$_4$; D = 0 | B = 0; C = 1 | 0.52 | 6.52 | 40/10/88/1/1 | — | 5 |
| 2 | A wherein A = 0; B = 0.055 TiCl$_4$; C = 0.053 VCl$_4$; D = 0 | B = 0; C = 1 | 0.069 | 6.52 | 40/10/88/1/1 | — | 0 |
| 3 | A wherein A = 0; B = 0.055 TiCl$_4$; C = 0.053 VCl$_4$; D = 0 | B = 0; C = 1 | 1.27 | 6.42 | 40/10/88/1/1 | — | 10 |
| A | A wherein A = 0; B = 0.055 TiCl$_4$; C = 0; D = 0 | B = 0; C = 1 | 0.47 | 10 | 40/10/84/0/1 | — | 0 |
| B | E wherein A = 0; B = 0.055 TiCl$_4$; D = 0.0005; C = 0 | B = 0; C = 0.8 | 0.64 | 7.66 | 40/8/84/0/1 | I, OH's are para, R = t-butyl | 0 |
| C | E wherein A = 0; B = 0.055 TiCl$_4$; D = 0.0005; C = 0 | B = 0; C = 0.8 | 0.83 | 8.29 | 40/8/84/0/1 | I, OH's are para, R = t-butyl | 5 |
| 4 | E wherein A = 0; B = 0.055 TiCl$_4$; D = 0.0005; C = 0.053 VCl$_4$ | B = 0; C = 1 | 0.08 | 7.13 | 40/10/88/1/1 | I, OH's are para, R = t-butyl | 0 |
| 5 | E wherein A = 0; B = 0.055 TiCl$_4$; D = 0.0005; C = 0.053 VCl$_4$ | B = 0; C = 1 | 0.61 | 8 | 40/10/88/1/1 | I, OH's are para, R = t-butyl | 5 |
| D | E wherein A = 0; B = 0.055 TiCl$_4$; D = 0.0005; C = 0 | B = 0; C = 1 | 0.13 | 10 | 40/10/84/0/1 | VIII, y = 0 | 0 |
| E | E wherein A = 0; B = 0.055 TiCl$_4$; D = 0.0005; C = 0 | B = 0; C = 1 | 0.67 | 8.25 | 40/10/84/0/1 | VIII, y = 0 | 5 |
| F | E wherein A = 0; B = 0.055 TiCl$_4$; D = 0.0005; C = 0 | B = 0; C = 1 | 1.5 | 8.11 | 40/10/84/0/1 | VIII, y = 0 | 10 |
| 6 | E wherein A = 0; B = 0.055 TiCl$_4$; D = 0.0005; C = 0.053 VCl$_4$ | B = 0; C = 1 | 0.13 | 6.77 | 40/10/88/1/1 | VIII, y = 0 | 0 |
| 7 | E wherein A = 0; B = 0.055 TiCl$_4$; D = 0.0005; C = 0.053 VCl$_4$ | B = 0; C = 1 | 0.48 | 7.98 | 40/10/88/1/1 | VIII, y = 0 | 5 |
| 8 | E wherein A = 0; B = 0.055 TiCl$_4$; D = 0.0005; C = 0.053 VCl$_4$ | B = 0; C = 1.5 | 0.1 | 8.6 | 40/15/88/1/1 | I, OH's are ortho, R = 4-t-butyl | 0 |
| 9 | E wherein A = 0; B = 0.055 TiCl$_4$; D = 0.0005; C = 0.053 VCl$_4$ | B = 0; C = 1.5 | 0.97 | 6.3 | 40/15/88/1/1 | I, OH's are ortho, R = 4-t-butyl | 5 |
| G | E wherein A = 0; B = 0.055 TiCl$_4$; D = 0.0005; C = 0 | B = 0; C = 1.5 | 0.53 | 9.96 | 40/15/84/0/1 | I, OH's are ortho, R = 4-t-butyl | 0 |
| 10 | E wherein A = 0; B = 0.055 TiCl$_4$; D = 0; C = 0.047 VOCl$_3$ | B = 0; C = 1 | 0.149 | 7.85 | 40/10/87/1/1 | — | 0 |
| 11 | E wherein A = 0; B = 0.055 TiCl$_4$; D = 0; C = 0.047 VOCl$_3$ | B = 0; C = 1 | 1.02 | 6.1 | 40/10/87/1/1 | — | 5 |
| 12 | E wherein A = 0; B = 0.055 TiCl$_4$; D = 0.0005; C = 0.047 VOCl$_3$ | B = 0; C = 1 | 0.13 | 4.85 | 40/10/87/1/1 | I, OH's are para, R = t-butyl | 0 |

TABLE I-continued

| COMPARATIVE EXPERIMENT LETTER OR EXAMPLE # | CATALYST TYPE AND VOLUMES | VOLUMES OF CATALYST F | $I_2$ | $I_{10}$ | RATIO OF Mg/Al/Cl/V/Ti | LIGAND | $H_2$ psi |
|---|---|---|---|---|---|---|---|
| 13 | E wherein A = 0; B = 0.055 TiCl$_4$; D = 0.0005; C = 0.047 VOCl$_3$ | B = 0; C = 1 | 0.46 | 7.65 | 40/10/87/1/1 | I, OH's are para, R = t-butyl | 5 |
| 14 | E wherein A = 0; B = 0.055 TiCl$_4$; D = 0.0005; C = 0.047 VOCl$_3$ | B = 0; C = 1 | 0.87 | 8.38 | 40/10/87/1/1 | I, OH's are para, R = t-butyl | 10 |
| H | E wherein A = 0; B = 0.165 TiCl$_4$; D = 0.0015; C = 0 | B = 0; C = 1.5 | 0.85 | 8.8 | 40/15/92/0/1 | I, OH's are ortho, R = 4-t-butyl | 0 |
| 15 | E wherein A = 0; B = 0.165 TiCl$_4$; D = 0.0015; C = 0.141 VOCl$_3$ | B = 0; C = 1.5 | 0.25 | 7 | 40/15/101/3/3 | I, OH's are ortho, R = 4-t-butyl | 0 |
| 16 | E wherein A = 0; B = 0.165 TiCl$_4$; D = 0.0015 C = 0.141 VOCl$_3$ | B = 0; C = 1.5 | 0.88 | 8.1 | 40/15/101/3/3 | I, OH's are ortho, R = 4-t-butyl | 5 |
| I | E wherein A = 0; B = 0.165 TiCl$_4$; D = 0.0015; C = 0 | B = 0; C = 1 | 0.17 | 9.06 | 40/10/92/0/3 | VIII, y = 0 | 0 |
| J | E wherein A = 0; B = 0.165 TiCl$_4$; D = 0.0015; C = 0 | B = 0; C = 1 | 0.78 | 7.17 | 40/10/92/0/3 | VIII, y = 0 | 5 |
| 17 | E wherein A = 0; B = 0.165 TiCl$_4$; D = 0.0015; C = 0.141 VOCl$_3$ | B = 0; C = 1.2 | 0.11 | 8.73 | 40/12/101/3/3 | VIII, y = 0 | 0 |
| 18 | E wherein A = 0; B = 0.165 TiCl$_4$; D = 0.0015; C = 0.141 VOCl$_3$ | B = 0; C = 1.2 | 1.09 | 7.14 | 40/12/101/3/3 | VIII, y = 0 | 5 |
| 19 | E wherein A = 0; B = 0.165 TiCl$_4$; D = 0.0015; C = 0.282 VOCl$_3$ | B = 0; C = 1.2 | 0.28 | 8.61 | 40/12/110/6/3 | VIII, y = 0 | 0 |
| 20 | E wherein A = 0; B = 0.165 TiCl$_4$; D = 0.0015; C = 0.282 VOCl$_3$ | B = 0; C = 1.2 | 0.86 | 8.23 | 40/12/110/6/3 | VIII, y = 0 | 5 |
| 21 | E wherein A = 0; B = 0.055 TiCl$_4$; D = 0.0005; C = 0.106 VCl$_4$ | B = 0; C = 1.2 | 0.14 | 9.64 | 40/12/92/2/1 | VIII, y = 0 | 0 |
| 22 | E wherein A = 0; B = 0.055 TiCl$_4$; D = 0.0005; C = 0.106 VCl$_4$ | B = 0; C = 1.2 | 0.93 | 7.78 | 40/12/92/2/1 | VIII, y = 0 | 5 |
| 23 | E wherein A = 0; B = 0.055 TiCl$_4$; D = 0; C = 0.047 VOCl$_3$ | B = 0; C = 1 | 0.149 | 7.85 | 40/10/87/1/1 | — | 0 |
| 24 | E wherein A = 0; B = 0.055 TiCl$_4$; D = 0; C = 0.047 VOCl$_3$ | B = 0; C = 1 | 1.02 | 6.1 | 40/10/87/1/1 | — | 0 |
| 25 | E wherein A = 0; B = 0.055 TiCl$_4$; D = 0.0005; C = 0.047 VOCl$_3$ | B = 0; C = 1 | 0.13 | 4.85 | 40/10/87/1/1 | I, OH's are para, R = t-butyl | 0 |
| 26 | E wherein A = 0; B = 0.055 TiCl$_4$; D = 0.0005; C = 0.047 VOCl$_3$ | B = 0; C = 1 | 0.46 | 7.65 | 40/10/87/1/1 | I, OH's are para, R = t-butyl | 5 |
| 27 | E wherein A = 0; B = 0.055 TiCl$_4$; D = 0.0005; C = 0.047 VOCl$_3$ | B = 0; C = 1 | 0.87 | 8.38 | 40/10/87/1/1 | I, OH's are para, R = t-butyl | 10 |
| K | E wherein A = 0; B = 0.165 TiCl$_4$; D = 0.0015; C = 0 | B = 0; C = 1.5 | 0.85 | 8.8 | 40/15/92/0/3 | I, OH's are ortho; R = 4-t-butyl | 0 |

TABLE I-continued

| COMPARATIVE EXPERIMENT LETTER OR EXAMPLE # | CATALYST TYPE AND VOLUMES | VOLUMES OF CATALYST F | $I_2$ | $I_{10}$ | RATIO OF Mg/Al/Cl/V/Ti | LIGAND | $H_2$ psi |
|---|---|---|---|---|---|---|---|
| 28 | E wherein A = 0; B = 0.165 TiCl$_4$; D = 0.0015; C = 0.141 VOCl$_3$ | B = 0; C = 1.5 | 0.25 | 7 | 40/15/101/3/3 | I, OH's are ortho, R = 4-t-butyl | 0 |
| 29 | E wherein A = 0; B = 0.165 TiCl$_4$; D = 0.0015; C = 0.141 VOCl$_3$ | B = 0; C = 1.5 | 0.88 | 8.1 | 40/15/101/3/3 | I, OH's are ortho, R = 4-t-butyl | 5 |
| L | E wherein A = 0; B = 0.165 TiCl$_4$; D = 0.0015; C = 0 | B = 0; C = 0.9 | 0.045 | 11.33 | 40/9/92/0/3 | I, OH's are para, R = t-butyl | 0 |
| M | E wherein A = 0; B = 0.165 TiCl$_4$; D = 0.0015; C = 0 | B = 0; C = 0.9 | 0.47 | 7.34 | 40/9/92/0/3 | I, OH's are para, R = t-butyl | 5 |
| N | E wherein A = 0; B = 0.165 TiCl$_4$; D = 0.0015; C = 0 | B = 0; C = 0.9 | 1.14 | 7.4 | 40/9/92/0/3 | I, OH's are para, R = t-butyl | 10 |
| O | E wherein A = 0; B = 0.165 TiCl$_4$; D = 0; C = 0 | B = 0; C = 1 | 0.52 | 8.63 | 40/10/92/0/3 | — | 0 |
| 30 | E wherein A = 0; B = 0.165 TiCl$_4$; D = 0; C = 0.141 VOCl$_3$ | B = 0; C = 1 | 0.24 | 9.38 | 40/10/101/3/3 | — | 0 |
| 31 | E wherein A = 0; B = 0.165 TiCl$_4$; D = 0; C = 0.141 VOCl$_3$ | B = 0; C = 1 | 0.85 | 7.86 | 40/10/101/3/3 | — | 5 |
| 32 | E wherein A = 0; B = 0.165 TiCl$_4$; D = 0.015; C = 0.141 VOCl$_3$ | B = 0; C = 1.2 | 0.064 | 10.6 | 40/12/101/3/3 | I, OH's are para, R = t-butyl | 0 |
| 33 | E wherein A = 0; B = 0.165 TiCl$_4$; D = 0.015; C = 0.141 VOCl$_3$ | B = 0; C = 1.2 | 0.805 | 7.18 | 40/12/101/3/3 | I, OH's are para, R = t-butyl | 5 |
| 33 | E wherein A = 0; B = 0.165 TiCl$_4$; D = 0; C = 0.282 VOCl$_3$ | B = 0; C = 1.2 | 0.37 | 7.65 | 40/12/110/6/3 | — | 0 |
| 34 | E wherein A = 0; B = 0.165 TiCl$_4$; D = 0; C = 0.282 VOCl$_3$ | B = 0; C = 1.2 | 1.02 | 8.16 | 40/12/110/6/3 | — | 5 |
| 35 | E wherein A = 0; B = 0.165 TiCl$_4$; D = 0.0015; C = 0.282 VOCl$_3$ | B = 0; C = 1.5 | 0.55 | 8.65 | 40/15/110/6/3 | I, OH's are ortho, R = 4-t-butyl | 0 |
| 36 | E wherein A = 0; B = 0.165 TiCl$_4$; D = 0.0015; C = 0.282 VOCl$_3$ | B = 0; C = 1.5 | 0.23 | 5.26 | 40/15/110/6/3 | I, OH's are para, R = t-butyl | 0 |
| 37 | E wherein A = 0; B = 0.165 TiCl$_4$; D = 0.0015; C = 0.282 VOCl$_3$ | B = 0; C = 1.5 | 0.8 | 7.81 | 40/15/110/6/3 | I, OH's are para, R = t-butyl | 5 |
| 38 | E wherein A = 0; B = 0.055 TiCl$_4$; D = 0; C = 0.106 VCl$_4$ | B = 0; C = 1 | 0.116 | 9.22 | 40/10/92/2/1 | — | 0 |
| 39 | E wherein A = 0; B = 0.055 TiCl$_4$; D = 0; C = 0.106 VCl$_4$ | B = 0; C = 1 | 0.98 | 7.41 | 40/10/92/2/1 | — | 5 |
| 40 | E wherein A = 0; B = 0.055 TiCl$_4$; D = 0.0005; C = 0.106 VCl$_4$ | B = 0; C = 1.5 | 0.18 | 6.05 | 40/15/92/2/1 | I, OH's are ortho, R = 4-t-butyl | 0 |
| 41 | E wherein A = 0; B = 0.055 TiCl$_4$; D = 0.0005; C = 0.106 VCl$_4$ | B = 0; C = 1.5 | 0.63 | 9.54 | 40/15/92/2/1 | I, OH's are ortho, R = 4-t-butyl | 5 |
| 42 | E wherein A = 0; | B = 0; | 0.15 | 5.6 | 40/12/92/2/1 | I, OH's | 0 |

TABLE I-continued

| COMPARATIVE EXPERIMENT LETTER OR EXAMPLE # | CATALYST TYPE AND VOLUMES | VOLUMES OF CATALYST F | $I_2$ | $I_{10}$ | RATIO OF Mg/Al/Cl/V/Ti | LIGAND | $H_2$ psi |
|---|---|---|---|---|---|---|---|
|  | B = 0.055 TiCl$_4$; D = 0.0005; C = 0.106 VCl$_4$ | C = 1.2 |  |  |  | are para, R = t-butyl |  |
| 43 | E wherein A = 0; B = 0.055 TiCl$_4$; D = 0.0005; C = 0.106 VCl$_4$ | B = 0; C = 1.2 | 0.49 | 8.37 | 40/12/92/2/1 | I, OH's are para, R = t-butyl | 5 |
| 44 | E wherein A = 0; B = 0.055 TiCl$_4$; D = 0.0005; C = 0.106 VCl$_4$ | B = 0; C = 1.2 | 1.16 | 8.23 | 40/12/92/2/1 | I, OH's are para, R = t-butyl | 10 |
| 45 | E wherein A = 0; B = 0.165 TiCl$_4$; D = 0; C = 0.159 VCl$_4$ | B = 0; C = 1.2 | 0.23 | 6.09 | 40/12/104/2/1 | — | 0 |
| 46 | E wherein A = 0; B = 0.165 TiCl$_4$; D = 0; C = 0.159 VCl$_4$ | B = 0; C = 1.2 | 0.68 | 8.49 | 40/12/104/2/1 | — | 5 |

TABLE II

| COMPARATIVE EXPERIMENT LETTER OR EXAMPLE # | CATALYST TYPE AND VOLUMES | VOLUMES OF CATALYST F | $I_2$ | $I_{10}/I_2$ | RATIO OF Mg/Al/Cl/V/Ti | LIGAND | $H_2$ | Mw/Mn |
|---|---|---|---|---|---|---|---|---|
| P | E wherein A = 4; B = 0.45 Tipt; D = 0; C = 0 | B = 0; C = 1.2 | 0.38 | 13.7 | 40/24/104/0/3 | — | 0 | 10.4 |
| 47 | B wherein A = 4; C = 0.159 VCl$_4$; B = 0.45 Tipt; D = 0 | B = 0; C = 2.4 | 0.52 | 5.11 | 40/36/116/3/3 | — | 0 | 9.01 |
| 48 | A wherein A = 4; B = 0.45 Tipt; C = 0.159 VCl$_4$; D = 0 | B = 0; C = 2.4 | 0.38 | 8.29 | 40/36/116/3/3 | — | 0 | 8.24 |
| 49 | A wherein A = 4; B = 0.45 Tipt; C = 0.318 VCl$_4$; D = 0 | B = 0; C = 2.4 | 0.32 | 8.5 | 40/36/128/3/3 | — | 0 | 8.77 |
| 50 | D wherein C = 0.159 VCl$_4$; A = 4; B = 0.45 Tipt; D = 0 | B = 0; C = 2.4 | 0.31 | 8.55 | 40/36/116/3/3 | — | 0 | 8.53 |
| Q | A wherein A = 4; B = 0.45 Tipt; C = 0; D = 0 | B = 3 VCl$_4$; C = 2.4 | 0.22 | 11.45 | 40/36/116/3/3 | — | 0 | — |
| R | A wherein A = 4; B = 0.45 Tipt; C = 0; D = 0 | B = 6 VCl$_4$; C = 2.4 | 0.36 | 8.69 | 40/36/128/6/3 | — | 0 | — |
| 51 | B wherein A = 4; C = 0.141 VOCl$_4$; B = 0.45 Tipt; D = 0 | B = 0; C = 2.4 | 0.15 | 8.15 | 40/36/113/3/3 | — | 0 | — |
| 52 | A wherein A = 4; B = 0.45 Tipt; C = 0.141 VOCl$_3$; D = 0 | B = 0; C = 3 | 0.28 | 9.89 | 40/42/113/3/3 | — | 0 | 10.2 |
| 53 | D wherein C = 0.141 VOCl$_3$; A = 4; B = 0.45 Tipt; D = 0 | B = 0; C = 2.4 | 0.24 | 9.02 | 40/36/113/3/3 | — | 0 | 9.93 |
| S | A wherein A = 4; B = 0.45 Tipt; C = 0; D = 0 | B = 6 VOCl$_3$; C = 2.4 | 0.32 | 8.32 | 40/36/122/6/3 | — | 0 | 9.65 |

The above data indicates that when the polymerization conditions are operated so as to produce a polymer having a melt flow or melt index by ASTM D 1238-70 of less than or equal to 1.5 the polymers produced with a catalyst containing vanadium had a lower melt flow ratio ($I_{10}/I_2$) indicating a narrower molecular weight distribution as compared to a like catalyst containing no vanadium. The melt flow of the polymers can be adjusted by the amount of hydrogen employed or by altering the temperature.

Following the procedure for the preparation of the complexes, various vanadium complexes were prepared. The components are given in Table III.

The L/M ratio in each instance was 1:1 (moles of dihydroxyl compound per mole of V). The components employed are given in the following Table III. The elemental analysis for each of the products and water of hydration in the products is also given in Table III.

TABLE III

| EXAMPLE NUMBER | HYDROXYL COMPOUND | VANADIUM COMPOUND | ELEMENTAL ANALYSIS % C CALC. | % C FND. | % H CALC. | % H FND. | WATER OF HYDRATION |
|---|---|---|---|---|---|---|---|
| 54 | Formula VIII wherein y = 0 | VO(OiPr)$_3$ | 65.9 | 66.2 | 4.8 | 5.2 | 0.5 |
| 55 | Formula VIII wherein y = 0 | VO(OiPr)$_3$ | 58 | 58.1 | 3.1 | 3.2 | 1.5 |
| 56 | Formula II wherein y = 0; n = 0; OH's are ortho to the bridge | VO(OiPr)$_3$ | 59.3 | 58.7 | 5.3 | 5.2 | 0 |
| 57 | Formula II wherein y = 0; n = 0; OH's are ortho to the bridge | VO(Cl)$_3$ | 47.7 | 47.7 | 4 | 3.4 | 1.5 |
| 58 | Formula II wherein n = 1; y = 0; A = CH$_2$; OH's are ortho to the bridge | VO(OiPr)$_3$ | 56.4 | 55.6 | 5.1 | 4.8 | 0.5 |
| 59 | Formula II wherein n = 1; y = 0; A = CH$_2$; OH's are ortho to the bridge | VO(Cl)$_3$ | 48.8 | 49 | 3.1 | 2.5 | 0.5 |
| 60 | Formula I wherein y = 1; R = OH; X = t-butyl; OH's are para to ring | VO(OiPr)$_3$ | 53.8 | 53.4 | 6.6 | 5.9 | 0 |
| 61 | Formula I wherein n$^2$ = 1; R$^1$ = H; R$^2$ = CH$_3$ | VO(Cl)$_3$ | 25.2 | 28.6 | 4.23 | 5 | 0 |
| 62 | Formula XII wherein n = 1; A$^1$ = CH$_2$; OH's are ortho to ring | VO(Cl)$_3$ | 40.3 | 40.5 | 3.4 | 3.3 | 0 |
| 63 | Formula X wherein n = 1; R$^1$ = H; R$^2$ = CH$_3$ | VO(OiPr)$_3$ | 39.2 | 39.2 | 7.1 | 7.4 | 0 |
| 64 | Formula XII wherein n$^2$ = 1; x$^1$ = 1; A$^1$ = CH$_2$; OH's are ortho to ring | VO(OiPr)$_3$ | 55.4 | 55.6 | 4.9 | 4.9 | 0.5 |

I claim:

1. In a catalyst which is the catalytic product resulting from reacting in an inert hydrocarbon medium
   (A) at least one hydrocarbon soluble organomagnesium component represented by the formula MgR"$_2$.xMR"$_y$ wherein each R" is independently a hydrocarbyl group having from 1 to 20 carbon atoms; M is a metal selected from Al, Zn, Si, Sn, B and P; y has a number corresponding to the valence of M and x has a value from zero to about 10;
   (B) a sufficient quantity of at least one halide source so as to convert all of the organic groups attached to a magnesium atom in component (A) to a halide group; said halide source being selected from
      (1) an active non-metallic halide, said non-metallic halide corresponding to the formula R'X wherein R' is hydrogen or a hydrocarbyl group having from 1 to about 20 carbon atoms and such that the hydrocarbyl halide is at least as active as sec-butyl chloride and does not poison the catalyst and X is halogen; or
      (2) a metallic halide corresponding to the formula MR$_{y-a}$X$_a$ wherein M is a metal of Group IIIA or IVA of Mendeleev's Periodic Table of Elements, R is a monovalent hydrocarbyl group having from 1 to about 20 carbon atoms, X is halogen, y is a number corresponding to the valence of M and a is a number from 1 to y;
   (C) at least one titanium compound represented by the formula Ti(OR)$_x$X$_{4-x}$ wherein each R is independently a hydrocarbyl group having from 1 to about 20 carbon atoms; X is a halogen and x has a value from zero to 4; and
   (D) optionally, at least one compound containing at least one aromatic hydroxyl group or at least one aliphatic hydroxyl group or a mixture of such compounds; and when components (A) and/or (B) do not contain or contain an insufficient quantity of aluminum, then
   (E) an aluminum compound represented by the formula AlR$_{y'}$X$_{y''}$ wherein R is a hydrocarbyl group having from 1 to about 10 carbon atoms; X is halogen and y' and y'' each have a value of from zero to three with the sum of y' and y" being three is employed;

and wherein the components are employed in quantities so as to provide the following ratios:

(1) a Mg:Ti atomic ratio of from about 1:1 to about 200:1;

(2) components (C) and (D) are employed in quantities which provide a molar ratio of (D):(C) of from about 0:1 to about 10:1;

(3) an excess X to Al ratio of from about 0.0005:1 to about 10:1;

(4) an Al:Ti atomic ratio of from about 0.1:1 to about 2000:1;

the improvement which comprises employing in the reaction (F) a vandium compound represented by the formulas $VO(X)_3$, $V(X)_4$ or $VO(OR)_3$ wherein X is halogen and R is a hydrocarbyl group having from 1 to 10 carbon atoms; the Mg:Ti ratio expressed above is expressed as a Mg:Ti+V ratio with the same values as the Mg:Ti ratio and wherein component (F) is employed in quantities which provides a V:Ti ratio of from about 0.1:1 to about 50:1.

2. A catalyst of claim 1 wherein (i) in component (A) M is aluminum;

(ii) component (B) is hydrogen chloride or an aluminum chloride;

(iii) the Mg:Ti+V atomic ratio is from about 2:1 to about 100:1;

(iv) components (C) and (D) are present in quantities which provide a molar ratio of (D):(C) of from about 0.1:1 to about 10:1;

(v) the excess X:Al ratio is from about 0.002:1 to about 2:1;

(vi) the Al:Ti atomic ratio is from about 0.5:1 to about 200:1; and (vii) the V:Ti atomic ratio is from about 0.5:1 to about 10:1.

3. A catalyst of claim 2 wherein (i) component (A) is n-butyl-s-butylmagnesium or n-butyl-ethylmagnesium;

(ii) the Mg:Ti+V atomic ratio is from about 5:1 to about 50:1;

(iii) components (C) and (D) are present in quantities which provides a molar ratio of (D):(C) of from about 1:1 to about 2:1;

(iv) the excess X:Al ratio is from about 0.01:1 to about 1.4:1;

(v) the Al:Ti atomic ratio is from about 1:1 to about 75:1; and (vi) the V:Ti atomic ratio is from about 1:1 to about 5:1.

4. A catalyst of claim 3 wherein component (C) is titanium tetrachloride; and component (F) is vanadium tetrachloride.

5. A catalyst of claim 3 wherein component (C) is a tetralkoxytitanium compound, component (D) is ethylaluminum dichloride and component (F) is $VOCl_3$.

* * * * *